US007431352B2

(12) United States Patent
Thilly et al.

(10) Patent No.: US 7,431,352 B2
(45) Date of Patent: Oct. 7, 2008

(54) SYSTEM FOR PROVIDING COMMUNICATION BETWEEN THE INTERIOR AND THE EXTERIOR OF A COMPARTMENT

(75) Inventors: Jacques Thilly, Rixensart (BE); Christian Vandecasserie, Rixensart (BE)

(73) Assignee: GlaxoSmithKline Biologicals s.a., Rixensart (BE)

( * ) Notice: Subject to any disclaimer, the term of this patent is extended or adjusted under 35 U.S.C. 154(b) by 36 days.

(21) Appl. No.: 11/682,515

(22) Filed: Mar. 6, 2007

(65) Prior Publication Data

US 2007/0148995 A1 Jun. 28, 2007

Related U.S. Application Data

(62) Division of application No. 10/344,919, filed as application No. PCT/EP01/09381 on Aug. 13, 2001, now Pat. No. 7,192,065.

(30) Foreign Application Priority Data

Aug. 18, 2000 (GB) ................................ 0020272.1

(51) Int. Cl.
*F16L 19/00* (2006.01)
*E05C 19/00* (2006.01)

(52) U.S. Cl. ........................ 292/1; 292/257; 292/256.5; 285/402; 285/38; 403/322.4

(58) Field of Classification Search ..................... 292/1, 292/257, DIG. 33, 341.17, DIG. 11, 256.5; 403/322.4, 338; 285/402, 38, 920, 24
See application file for complete search history.

(56) References Cited

U.S. PATENT DOCUMENTS

| | | | | | |
|---|---|---|---|---|---|
| 1,329,141 | A | | 1/1920 | Rice | 251/148 |
| 3,108,625 | A | | 10/1963 | Lamb et al. | 83/402 |
| 3,488,067 | A | | 1/1970 | Sommer | 285/41 |
| 4,669,791 | A | * | 6/1987 | Savill | 439/34 |
| 4,747,622 | A | * | 5/1988 | Weinhold | 285/38 |
| 5,026,099 | A | * | 6/1991 | Hendrix | 285/315 |
| 5,418,379 | A | | 5/1995 | Parsons et al. | 250/497.1 |
| 5,806,397 | A | * | 9/1998 | Mendenhall | 83/402 |
| 5,871,241 | A | | 2/1999 | Van Essen | 285/377 |
| 6,553,722 | B1 | | 4/2003 | Porret et al. | 49/507 |
| 6,834,892 | B2 | | 12/2004 | Kornau et al. | 285/364 |

FOREIGN PATENT DOCUMENTS

| | | |
|---|---|---|
| DE | 30 42 613 | 6/1982 |
| EP | 0 312 460 | 4/1989 |
| EP | 0 688 020 | 12/1995 |
| EP | 0 742 562 | 11/1996 |
| EP | 0 748 967 | 12/1996 |

* cited by examiner

*Primary Examiner*—Carlos Lugo
*Assistant Examiner*—Mark Williams
(74) *Attorney, Agent, or Firm*—Jonathan M. Dermott; Edward R. Gimmi

(57) ABSTRACT

A system for making a connection between the interior and exterior of a compartment, comprising a door opening through the compartment wall, a connector body which can engage with the wall, and having a connection port through it, and a removable cover on the connector body. The body is engaged with the door opening, and an inner door within the compartment engages and removes the cover. A preferred construction creates a single line of confidence seal. The system is particularly suited for sterile compartments.

4 Claims, 9 Drawing Sheets

SYSTEM FOR PROVIDING COMMUNICATION BETWEEN THE INTERIOR AND THE EXTERIOR OF A COMPARTMENT

CROSS REFERENCE TO PRIOR APPLICATIONS

This application is a divisional of application Ser. No. U.S. 10/344,919, filed 25 Jul. 2003, now U.S. Pat. No. 7,192,065, which is a 371 of International Application No. PCT/EP01/09381, filed 13 Aug. 2001, which claims the benefit of Great Britain Application No. 0020272.1, filed 18 Aug. 2000.

This invention relates to a system for providing communication between the interior and exterior of a compartment. In particular it relates to a system for providing transfer of material, particularly a liquid, between the interior and exterior of a compartment which is an isolator compartment, e.g. a so called “glove box”, within which is a sterile environment, whilst maintaining a seal between the interior and ambient exterior of the compartment.

Normally an air-lock system is used for transfers of this type, involving an inner and outer double door arrangement. There can be difficulties when it is desired to connect together two compartments, both having an internal sterile environment, when the connection has to traverse an ambient environment such as the atmosphere of a laboratory. U.S. Pat. No. 5,853,207 discloses a system for doing so. There are particular difficulties when it is desired to transfer a liquid from the sterile interior of one compartment to the sterile interior of another compartment. Known systems tend to be complicated and expensive.

There is a need to provide cheap, simple, reliable mechanisms of this type, and an object of the present invention is to provide such a mechanism.

STATEMENT OF INVENTION

According to this invention a system for connecting the interior of a compartment to the exterior of the compartment comprises:

a wall part of the compartment having a door opening therein passing through the wall from inside to outside;

a connector body sealingly engageable from the outside of the compartment with the wall part around the door opening;

a connection port passing through the connector body from an inside facing surface to an outside facing surface of the connector body, the port having an inner opening on the inside facing side of the connector body and an outer opening on the outside facing side of the connector body;

a cover removeably mountable on the connector body and which when mounted on the connector body is sealed to the connector body and together with the connector body forms an enclosure that encloses the inner opening of the port to thereby isolate the inner opening of the port from the environment outside the cover;

an outer door of the door opening which can seal the door opening and is openable to allow the connector body to be engaged with the wall part with an inside facing side of the connector body facing the interior of the compartment, an inner door which can seal the door opening and is openable within the compartment, and is releasably engageable with the cover when the connector body is engaged with the wall part, so that the inner door can be operated to thereby remove the engaged cover from the connector body so as to expose the inner opening of the port to the interior of the compartment, and so that when engaged with the cover the inner door seals with the cover to enclose the parts of the cover which prior to engagement of the connector body with the door opening have been exposed to the environment outside the compartment and to isolate these from the interior of the compartment.

Compartment.

Preferably the compartment is an isolator for containing a material in isolation from the outside ambient environment in a sterile environment inside the isolator. Preferably the compartment is bounded by wall parts made of rigid metal or plastics material. Preferably the door opening in the wall part comprises an aperture passing completely through the wall part from the outside to the inside. The compartment is preferably provided in a known manner with internally extending long gloves sealed with the wall of the compartment to enable an operator to manipulate materials within the compartment and to operate the system of the invention.

Connector Body.

Preferably the connector body is of a generally tubular shape having an open end which when the connector body is engaged with the wall part faces into the interior of the compartment, i.e. being an inside facing end, and an opposite closed end, and the part of the connector body adjacent to the open end comprises a tubular body sleeve.

Preferably the connector body has a sealing surface which mates with a corresponding sealing surface of the wall part, e.g. around the door opening. Such a sealing surface may comprise a sealing flange mating sealingly with a corresponding mating surface of the wall part around the door opening. Suitably a body sleeve as described above has such an external sealing flange at least partly around it. Preferably the sealing flange has a convex conical flange surface which mates with a corresponding concave conical mating surface of the wall part, with a compression seal, e.g. a soft resilient, e.g. an elastomeric (rubbery), sealing washer between the sealing surfaces. Preferably such a conical flange surface tapers in the direction away from the closed end.

Cover.

Preferably the cover is of a generally tubular shape having an open end which when the cover is engaged with the connector body faces in the opposite direction to the open end of the body sleeve, and an opposite closed end, and the part of the cover adjacent to the open end comprises a tubular cover sleeve which engages with the body sleeve in a telescoping manner. In such telescoping engagement the cover sleeve may be either external but preferably internal within the body sleeve. The body and cover sleeves preferably also engage by means of respective co-operating screw threads on them.

Preferably there is a compression seal, e.g. a compressible elastomeric seal washer, between such body and cover sleeves so that the interior of the engaged connector body and cover may be isolated from the ambient environment by this seal. For example such a compression seal may comprise a sealing washer with a shallow angled (e.g. ca. 5°) contact surface so that longitudinal relative movement of the connector body and cover sleeves as they telescope together forces the surface of one sleeve in a wedging action against the surface of the sealing washer to form a good seal. For example such an angled washer may be a conically outer surfaced ring washer surrounding the inner (e.g. the cover) sleeve of the telescoping sleeves so that the narrow end of the cone is driven toward the outer (e.g. the connector body) sleeve as the two sleeves telescope together. Suitably the surface of the connector body sleeve (e.g. the inner surface of the open end of the connector body sleeve) which contacts the washer to form such a seal may also have a correspondingly angled, e.g. corresponding conical, surface to ensure a good seal is made.

The connector body and cover may be provided as replaceable parts of the system, and may be made of cheap plastic materials, suitably plastic materials which are capable of sterilization.

Port

Preferably the port comprises a rigid tube passing through the connector body, e.g. the closed end of a generally tubular connector body as described above, preferably extending on the inside facing side beyond the open end of the generally tubular body, preferably being coaxial with the tubular body.

Such a tube typically has outer and inner open ends respectively open on the outer side and inside facing side of the connector body. To isolate the interior of the connector body the outer open end may be provided with a closure, e.g. a cap or plug.

Preferably, to facilitate the transfer of a liquid between the interior and exterior of the compartment the port may be connectable at one or both open ends to a flexible tube, e.g. of the type commonly used fluid transfer in laboratories. One form of port is a rigid tube extending through the connector body from its outside facing side to its inside facing side, having one or both of its open ends connectable to a flexible tube. A port in the form of such a rigid tube may preferably be made integrally in one moulded piece with the connector body. Alternatively the port may comprise an opening through the connector body with which such a rigid tube may be connected, e.g. an opening through which a rigid tube may be threaded, preferably forming a seal between the exterior of the rigid tube and the opening.

Outer Door

Preferably the outer door comprises a plate part which seals against a sealing surface of the exterior of the wall part, preferably against a compression seal, e.g. a compressible elastomeric washer, between the plate part and the wall part. The outer door may be retained against the wall part by for example conventional clamping means. Preferably the outer door may be completely removable from the wall part to facilitate wide opening, ease of access to the door opening, and the engagement of the connector body with the wall part.

Inner Door

The inner door is an important feature of the invention and fulfils a number of functions, for example in the following preferred ways.

Sealing the door opening from the inside and being openable within the compartment may be achieved by the inner door sealing against a sealing surface of the interior of the wall part, preferably with a compression seal, e.g. a compressible elastomeric washer, between the inner door and the wall part. Preferably the inner door has a sealing surface in the form of a sealing flange at its outer perimeter which preferably includes a conical flange surface which mates with a corresponding mating surface of the wall part, with a compression sealing washer between these mating conical surfaces.

Engagement of the inner door with the compartment wall may be by for example conventional means such as a bayonet connection (i.e. requiring both a relative longitudinal and rotational movement of the inner door and wall part for engagement and disengagement). To operate such a connection the inner door may be provided with an operating handle, preferably operable from within the compartment, for example by an operator using the above-mentioned gloves. To further facilitate use the wall of the compartment may be made transparent or be provided with an appropriately placed window, or the interior of the compartment may be provided with closed-circuit television, so the operator can see parts of the system inside the compartment. Preferably the inner door may be completely removeable from the wall part to facilitate wide opening, ease of access to the door opening, and ease of manipulation within the compartment.

Releasable engagement with the cover when the connector body is engaged with the wall part may be achieved by the cover having one or more engagement parts by which it can engage with the inner door, for example a knob or hook externally on the closed end of the cover, or external engagement projections or ribs etc. on the sides of the cover, so as to be accessible within the compartment, and the inner door being provided with engagement means which engage the above-mentioned engagement part(s) of the cover. The engagement means of the inner door with the cover may for example comprise gripping means, for example releasably engageable gripping jaws, which may for example grip an engagement part on the cover. Such an engagement means enables the inner door can be operated so as to thereby remove the engaged cover from the connector body so as to expose the inner opening of the port to the interior of the compartment.

The engagement between the inner door and the cover may be a sufficiently secure engagement that suitable force can be applied to the cover via the engaged inner door to enable the cover and the connector body to be disengaged. For example the engagement means may be sufficiently secure to enable a cover and connector body in the form of telescoping sleeves to be pulled longitudinally apart, e.g. against the friction of a compression seal between them. For example if the cover and connector body engage by means of the above-mentioned screw threads, and particularly if the inner door engages with the wall part by a bayonet connection then the engagement means between the inner door and the cover may be a non-rotation coupling so that rotation of the inner door to disengage the bayonet connection causes the engaged cover to rotate together with the inner door and results in unscrewing of the screw connection between the cover and the connector body—and vice versa. Preferably the bayonet connection and screw threads may have the same pitch, so that when the cover is engaged with the inner door, the same rotational movement of the inner door which causes dis-engagement of the bayonet connection to thereby open the inner door also dis-engages the screw threads of the body and cover sleeves—and vice versa.

Sealing of the inner door with the cover to enclose the parts of the cover which prior to engagement of the connector body with the door opening have been exposed to the environment outside the container may be achieved by an inner door which comprises a sheath part which seals against the outside of the cover to enclose these parts of the cover. If the cover is of the above described tubular shape, a sheath part may also be in the form of a generally correspondingly internally shaped sleeve which fits over the cover. For example such a sheath part may be of a generally tubular shape having an open end which when the inner door is engaged with the wall part faces the wall part, and an opposite closed end which can fit over and enclose the cover when the sub-assembly of connector body plus engaged cover is engaged with the door opening from the outside of the compartment, and internally conforming closely to the external profile of the cover.

Such a sheath part may seal around the cover (to enclose the parts of the cover which prior to engagement of the connector body with the door opening have been exposed to the environment outside the compartment and to isolate these from the interior of the compartment as described above) at or adjacent to the open end of the sheath part, with the bulk of the cover enclosed within the sheath part. The inner surface of the sheath part and the outer surface of the cover may have respective surface parts that co-operate to provide a non-rotation engagement, e.g. the respective surfaces may be polygonal or may be provided with co-operating projections, e.g. longitudinal ribs.

Preferably also the engagement of the door, e.g. the sheath part, with the cover holds the cover in a fixed, preferably non-rotated, orientation with the inner door so that the inner door may be engaged and re-engaged with the wall part, with any of the above-mentioned co-operating screw threads on the cover and body sleeves remaining correctly aligned for the cover to engage the body.

A seal between such a sheath part and the cover may be achieved by means of a compression seal, positioned so as to be between the sheath part and the cover when the inner door and cover engage. Such a compression seal may be provided as a ring washer around a cover sleeve as described above, in a position such that when the sub-assembly of connector body and cover is engaged with the wall part the compression seal is compressed between the cover and the inner door. Suitably such a compression seal is positioned at the place where the open end of the sheath part is adjacent the cover.

Alternatively the cover may be made of soft plastic material so that a tight compression seal is formed between the cover and the sheath part where they are compressed together.

Gripping means as described above may be located within a sheath part adjacent the closed end of the sheath part and may also serve to hold the cover tightly together with the inner door, for example with the cover within the sheath part, such that a compression seal between the cover and the inner door, e.g. as described above, is maintained in compression so that a tight seal is maintained.

Particularly Preferred Construction of Body, Cover and Inner Door.

Therefore in a particularly preferred embodiment, the connector body and cover are both of the above-mentioned generally tubular shape having respective open ends which when the connector body is engaged with the cover face in opposite directions, the respective engaging parts of the body and cover comprises respective tubular sleeves which engage in a telescoping manner with the cover sleeve within the body sleeve, and the body and cover sleeves also engage by means of respective co-operating screw threads on them, with a compression seal between the sleeves, there is a bayonet connection between the inner door and wall part requiring both a relative longitudinal and rotational movement of the inner door and wall part for engagement and disengagement, the inner door comprises a generally cylindrical sheath part which seals against the outside of the cover to enclose the parts of the cover which prior to engagement of the connector body with the door opening have been exposed to the environment outside the container, the engagement between the inner door and the cover is a non-rotation coupling so that rotation of the inner door to dis-engage the bayonet connection causes the engaged cover to rotate together with the inner door and results in unscrewing of the screw connection between the cover and the connector body—and vice versa, the bayonet connection and the screw threads having the same pitch.

The outer and inner doors are suitably permanent parts of the system and may be made of robust metal components.

As a further preferred feature the system of the invention may be provided with one or more safety feature to prevent the interior of the compartment being opened directly to the outside atmosphere. For example there may be a mechanism to prevent both the outer and inner door being open if a connector body is not sealingly engaged with the wall part. Suitable constructions of such a mechanism will be apparent to those skilled in the art.

Line of Confidence Seal.

It is desirable to establish what is known in the art as a "line of confidence" seal between the environment outside the compartment and the, for example sterile, environment inside the compartment.

To achieve this it is preferred that the lines of the seals between (A) the connector body and the cover, (B) the cover and the engaged inner door, (C) the connector body and the wall part, and (D) the inner door and the wall part, all coincide to define a line of confidence seal. This line of confidence can be the split line between the line of the seal (B) between the inner door and the engaged cover, and the line of the seal (C) between the connector body and the wall part.

Therefore in a preferred construction the connector body is sealingly engageable from the outside of the compartment with the wall part at a seal (C) around the door opening;

the cover when mounted on the connector body is sealed to the connector body at a seal (A) to form the said enclosure that encloses the inner opening of the port;

the inner door seals the door opening at a seal (D), and when engaged with the cover the inner door seals with the cover at a seal (B) to enclose the parts of the cover which prior to engagement of the connector body with the door opening have been exposed to the environment outside the compartment and to isolate these from the interior of the compartment;

and when the cover is engaged with the wall part, and the inner door is engaged with the wall part, and the inner door is engaged with the cover and the body is engaged with the cover the seals (A), (B), (C) and (D) all coincide at a seal line, and the assembly of inner door and engaged cover is separable from the assembly of the body and the wall part at this seal line.

In a preferred embodiment when the connector body and the cover comprise the above-described telescoping sleeves, with the cover sleeve internal to the connector body sleeve, and with an inner door which comprises the above-mentioned sheath part, the line of confidence seal is preferably achieved by means of a single compression seal, e.g. a sealing washer, used to provide a seal (A) between the connector body and the cover, and (B) between the cover and the inner door, e.g. between a sheath part of the inner door and the cover, with the lines of these seals (A) and (B) coinciding.

With such a construction the line of confidence may consequently be a line across the surface of the compression seal. Such a construction enables a single line of confidence seal between the connector body, the cover and the sheath part. For example such a compression seal may be in the form of a ring washer around the cover sleeve, having a first sealing surface between the cover and the connector body, and another second sealing surface between the cover and the sheath part, with the line of confidence seal between these two sealing surfaces. For example these two sealing surfaces may be base-to-base conical surfaces with the line of confidence around the line where the bases meet.

In this preferred embodiment it is particularly preferred that this line of confidence coincides with the line of a seal (C) between the connector body and the wall part, and also with the line of a seal (D) between the wall part and the inner door. For example if the sealing surface of the connector body and the corresponding sealing surface of the wall part are conical flange surfaces, and the respective mating sealing surfaces between the cover and the sheath part of the inner door are also conical flange surfaces, then the respective conical surfaces may intersect along the same line.

Therefore in this particularly preferred construction all mating seals in the system meet at a single line of confidence, with a single split line as mentioned above.

A single compression seal, e.g. a single soft resilient washer may also be used to form a seal (C) between the connector body and the wall part and the seal (D) between the inner door and the wall part. This may be achieved by using a washer of substantially "U" section, so that the perimeter of the door opening fits into the concavity of the "U", one limb of the "U" provides a flat sealing surface for the outer door, and the convexity of the outer surface of the "U" is shaped to form two oppositely facing conical sealing surfaces with which correspondingly shaped conical flange surfaces of the connector body and the inner door may mate. The single line of confidence may therefore be around the line where the respective bases of these oppositely facing conical sealing surfaces meet.

Therefore preferably a first sealing washer is provided having opposite-facing base-to-base conical sealing surfaces to form seal (C) between respectively the wall part and the connector body and to form seal (D) between the wall part and the inner door, with a first line where the two base-to-base conical surfaces meet, and a second sealing washer is provided between the connector body and the cover also having two base-to-base conical sealing surfaces, to form respectively seal (A) between the body and the cover, and (B) between the inner door and the cover, with a second line where the two base-to-base conical surfaces meet, and when the connector body is engaged with the wall part and the inner door is engaged with the cover, the first and second lines coincide and define a line of confidence.

Separate Parts

The present invention further provides a combination of connector body and cover for a system as described above.

This combination may comprise:

a connector body sealingly engageable from the outside of a compartment with the wall part around a door opening of the compartment;

a connection port passing through the connector body from an inside facing surface to an outside facing surface of the connector body, the port having an inner opening on the inside facing side of the connector body and an outer opening on the outside facing side of the connector body;

a cover removeably mountable on the connector body and which when mounted on the connector body is sealed to the connector body and together with the connector body forms an enclosure that encloses the inner opening of the port to thereby isolate the inner opening of the port from the environment outside the cover.

The invention also provides a connector body and a cover suitable for the above combination and provided individually.

These combinations may be provided enclosed in a sealed, sterile package.

Preferred features of such a combination and its individual connector body and cover are as described above.

Method of Use.

The system of the present invention provides a cheap, simple and disposable device, comprising the combination of a connector body and cover described herein, which may be used in combination with a suitably constructed compartment, e.g. an isolator provided with inner and outer doors as described herein, in a method of transferring materials between the inside and outside of a compartment. The system is particularly useful for the transference of a, typically sterile, liquid into an isolator whilst avoiding the need to introduce a liquid container, the outside of which would normally require decontamination to maintain sterility within the compartment into the isolator.

The present invention therefore further provides a method for transferring a material, e.g. a liquid, between the inside and outside of a compartment using a system as described herein.

Typically the method of the invention comprises:

in relation to a compartment having an interior and an exterior, and a wall part of the compartment having a door opening therein passing through the wall from inside to outside and with an outer door closing the door opening and with an inner door being openable from within the compartment;

providing a connector body which is sealingly engageable with the wall part around the door opening from the outside of the compartment;

the connector body having a connection port passing through the connector body from an inside facing surface to an outside facing surface of the connector body, the port having an inner opening on the inside facing side of the connector body and an outer opening on the outside facing side of the connector body and having a cover removeably mountable on the connector body and which when mounted on the connector body is sealed to the connector body and together with the connector body forms an enclosure that encloses the inner opening of the port to thereby isolate the inner opening of the port from the environment outside the cover;

opening the outer door of the door opening and engaging the connector body with the wall part with the inside facing side facing the interior of the compartment, releasably engaging the inner door with the cover when the connector body is engaged with the wall part, to form an enclosure between the inner door and the cover that encloses the parts of the cover which prior to engagement of the connector body with the door opening have been exposed to the environment outside the container, operating the inner door to thereby remove the engaged cover from the connector body so as to expose the inner opening of the port to the interior of the compartment, opening the inner door, and transferring a material through the port from the outside of the compartment to the inside of the compartment or vice versa.

The method may comprise the transference of a liquid material, in which case it may involve the step of connecting a liquid transfer tube to one or both open ends of the port, and if appropriate connecting such liquid transfer tube(s) to a liquid source or receiver.

The method may involve one or more steps of sterilisation of one or more individual parts or assemblies of parts as mentioned above.

The method may involve a subsequent stage in which the connector body is removed from the compartment, which may comprise:

with the connector body engaged with the wall part, operating the inner door, with the cover releasably engaged with the inner door, to thereby engage the cover with the connector body to form an enclosure that encloses the inner opening of the port to thereby isolate the inner opening of the port from the environment outside the cover, sealingly engaging the inner door with the inner surface of the wall part of the compartment around the door opening, dis-engaging the inner door from the cover, dis-engaging the connector body from the wall part, closing the outer door.

If the method involves the transfer of a liquid via liquid transfer tubes, then the subsequent stage may involve disconnection of at least one liquid transfer tube from the port, in particular any such liquid transfer tube which is connected to the inner opening of the port.

The principal industrial application of the system of the invention is likely to be in connection with compartments which have a sterile interior to enable sterile transfer of material into and out of the compartment. However the system may be used in connection with compartments having other kinds of sensitive interior environments, for example containing biologically hazardous materials such as micro-organisms, viruses, radioactive materials etc.

The system and method of this invention will now be described by way of example only with reference to the accompanying drawings.

DRAWINGS

SPECIFIC DESCRIPTION

Figure 1A:
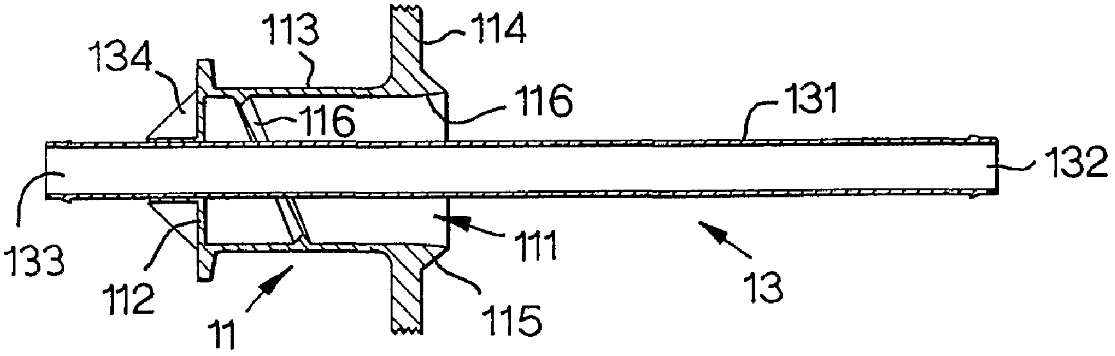
FIG. 1 shows a connector body, cover, and port.
Figure 1B:
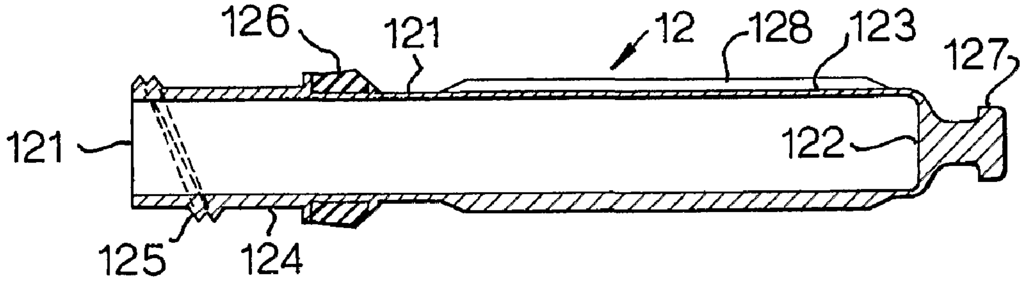

Referring to FIG. 1, FIGS. 1A to 1E show a sub-assembly 10 overall of a connector body 11, cover 12 and port 13.

The connector body 11 is of a generally tubular shape, having an open end 111 which when the connector body 11 is engaged with the wall part of a compartment (not shown in FIG. 1) faces into the interior of the compartment, and an opposite closed end 112. Part 112 of body 11 is in the form of a body sleeve and has an external sealing flange 114 around it, capable of mating sealingly with a corresponding mating surface of the wall part around the door opening of a compartment (not shown in FIG. 1). The sealing flange 114 has a convex conical flange surface 115 capable of mating with a corresponding concave conical mating surface of the wall part.

Figure 1C:
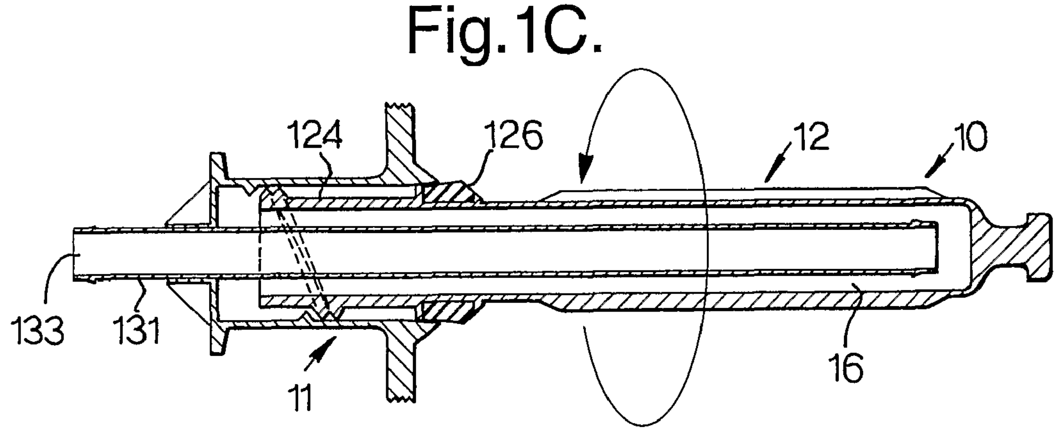

The cover 12 is of generally tubular shape having an open end 121 which when the cover 12 is engaged with the connector body 11 faces in the opposite direction to the open end 111 of the body 11, and an opposite closed end 122. Part 123 of the cover adjacent to the closed end 122 comprises a tubular cover sleeve, and part 124 of the cover adjacent to the open end 121 also comprises a tubular cover sleeve. As shown in FIG. 1C the body sleeve 113 and cover sleeve 124 engage in a telescoping manner, with the cover sleeve 124 fitting internally within the body sleeve 113. The body and cover sleeves 113, 124 also engage by means of respective co-operating screw threads 116, 125 on them. The threads 116, 125 are fairly steep, so that little relative rotation is needed to disengage the sleeves 113, 124.

A compression seal 126 being a compressible elastomeric seal washer is located as a ring washer externally around the cover sleeve 124, so that when the sleeves 113, 124 engage the seal 126 is compressed between sleeves 113, 124 to provide a seal so that the interior of the engaged connector body 11 and cover 12 is isolated from the ambient environment. The seal 126 is conically tapered at ca. 5° to allow easy compression of the seal 126 as the sleeves 113, 124 telescopically engage by relative longitudinal movement and the narrow end of the conical washer 126 is driven into the open end 111 of sleeve 113, and the open end 111 of sleeve 113 has a correspondingly conically tapered surface 116 to facilitate a mating seal.

The cover 12 has an engagement part 127 externally at its closed end 123 by which it can engage with an inner door of a compartment (not shown in FIG. 1), in the form of a grip knob. The sleeve 123 has external anti-rotation ribs 128 on its outer surface.

The connector body 11 and cover 12 are provided as replaceable parts of the system made of cheap plastic materials which are capable of sterilisation, and/or of being provided in a sealed sterile package.

The port 13 comprises a rigid tube 131 passing through the closed end 112 of the body sleeve 113, and extends on the inside facing side (the right hand side in FIG. 1) beyond the open end 111 of the body 1 being coaxial with the body sleeve 113. The tube 131 is integrally made as a moulding with the body 11. The tube 131 has an inner opening 132 on the inside (right) facing side of the connector body 11 and an outer opening 133 on the outside (left) facing side of the connector body 11. The tube 131 is connectable at one or both open ends 132, 133 to a flexible tube (not shown in FIG. 1) of the type commonly used to provide fluid connection in laboratories. Reinforcing ribs 134 are provided to strengthen the junction of parts 131 and 112 of the connector body.

Figure 1D:
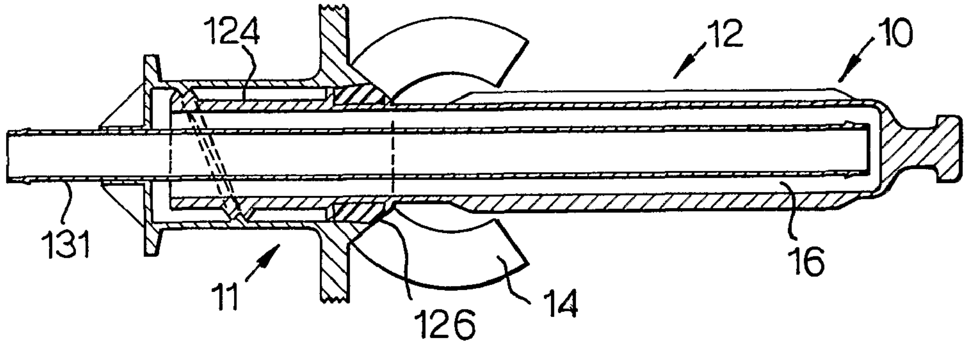

As seen in FIG. 1C the body 11, cover 12 and port 13 are assembled together. The body and cover sleeves 113, 124 engage by means of the screw threads 116, 125 as the connector body 11 and cover 12 rotate relative to each other as shown. For security adhesive tape 14 is fastened around the junction between surface 114 and seal 126 between body 11 and cover 12. As seen in FIG. 1D for extra security a locking nut 15 is fastened around flange 114 (which has an outer screw-threaded rim) to clamp body 11 and cover 12 together so as to protect the integrity of the seal 126.

It is therefore seen in FIGS. 1C and 1D that cover 12 is removeably mountable on the connector body 11, and when mounted on the connector body 11 is sealed to the connector body 11 via seal 126 and together with the connector body 11 forms an enclosure 16 that encloses the inner opening 132 of the port 131 to isolate this inner opening 132 from the environment outside of the cover 12. Parts 17 of the cover are exposed to the ambient environment and therefore cannot be assumed to be sterile. A closure cap or plug (not shown) may be provided for the open end 133 of tube 131.

Figure 2:
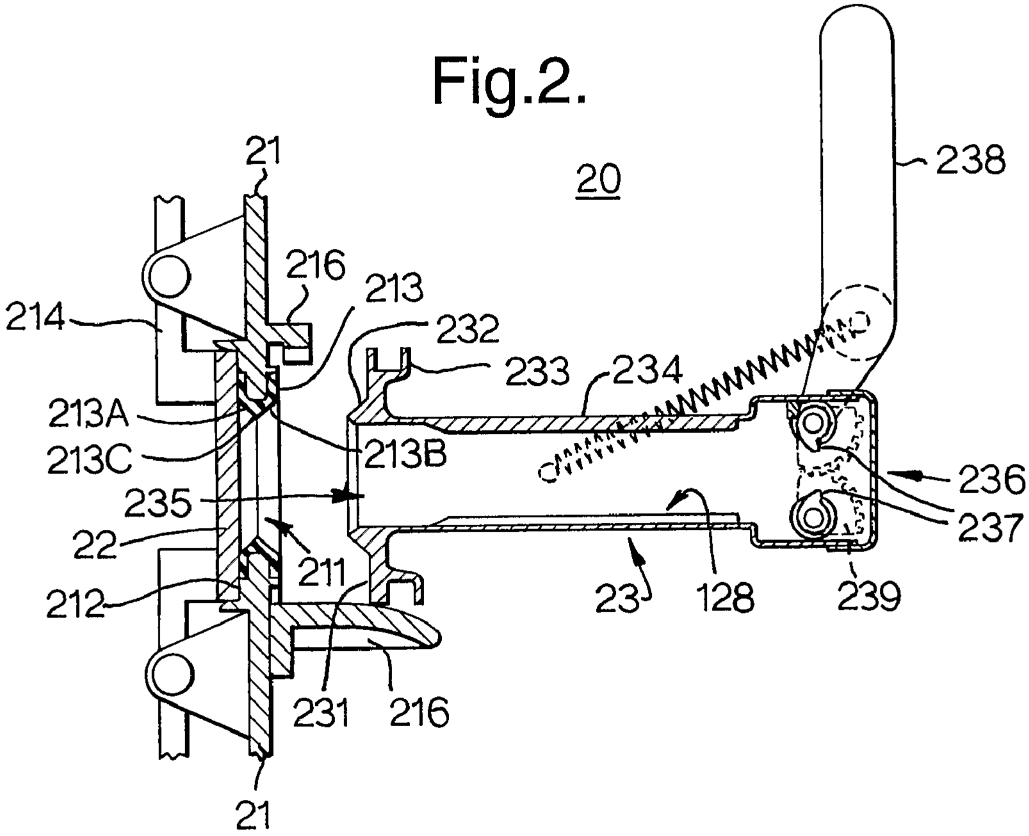
FIG. 2 shows a wall part, outer and inner doors.

Referring to FIG. 2 a construction of a compartment with a wall part 21, an outer door 22 and an inner door 23 is shown.

The compartment is an isolator with a sterile environment 20 inside (right side of the drawing) and an ambient environment outside (left side of the drawing). The compartment is bounded by wall parts 21 made of rigid metal or plastics material, and has a door opening 211 in the wall part 21 being an aperture passing completely through the wall part 21 from the outside to the inside. The compartment is provided with internally extending long gloves (not shown) sealed with the wall 21 of the compartment to enable an operator to manipulate materials within the compartment and to operate the system of the invention. The wall 21 is either transparent or has a window to enable an operator to see the parts of the system within the compartment 21.

The outer door 22 of the door opening 211 can seal the door opening 211 and is openable. The outer door 22 comprises a plate part which seals against a sealing surface 212 of the exterior of the wall part 21. A compression seal 213 being a compressible elastomeric washer is provided between the plate part 22 and the wall part 21. The outer door 22 is retained against the wall part 21 by conventional clamping means 214. When the clamping means 214 are released the outer door 22 is completely removeable from the wall part 21 to facilitate wide opening, ease of access to the door opening, and as will be described below, the engagement of the connector body 11 with the wall part 21.

The inner door 23 is sealingly engageable with the inner surface of the wall part 21 of the compartment around the door opening 211. The inner door 23 has a sealing flange 231 which mates with a corresponding mating surface of the wall part 21, and includes a convex conical flange surface 232, with the compression seal 213 between the sealing flange 231 and the surface of the wall part 21.

The inner door 23 is engageable with the wall part 21 by generally conventional bayonet connection parts 216, 233 respectively on the wall part 21 and the inner door 23. Engagement of the bayonet connection parts 216, 233 involves the presentation of the parts 216, 233 together, longitudinal (i.e. movement of the door 23 to the left as shown in FIG. 2 toward wall part 21) engagement of the parts 216, 233, then a rotational (i.e. about a rotation axis running left-right as shown in FIG. 2) movement of the parts 216, 233 to lock them, in a conventional bayonet connection manner. The inner door 23 is completely removeable from the wall part 21 to facilitate wide opening, ease of access to the door opening 211, and ease of manipulation within the compartment.

The inner door 23 comprises a sheath part 234 of a generally tubular shape having an open end 235 which when the inner door 23 is engaged with the wall part 21 faces the wall part 21, and an opposite closed end 236. As will be seen below the sheath part 234 can fit over and enclose the cover 12 when the connector body 11 plus engaged cover 12 is engaged with the door opening 21.

The sheath part 23 is engageable with cover 12 by means of the releasably engageable gripping jaws 237 located adjacent the closed end 236 of the sheath part 23 and which can grip the engagement part 127 of the cover 12. Jaws 237 are operable by means of an operating handle 238 operable within the compartment. The operating handle 238 operates the jaws 237 by means of a meshing gear arrangement 239. The operating handle 238 also facilitates the application of rotation force to the inner door 23 from within the compartment to thereby operate the bayonet connection 216, 233. The sheath part 23 also has internal anti-rotation ribs 128 on its inner surface. Detailed operation of the handle 238 and jaws 237 will be described later.

It will be seen that the single compression seal 213 forms a seal between the outer door 22 and the wall part 21, between the inner door 23 and the wall part 21, and (as will be seen below) between the connector body 11 and the wall part 21. This is achieved by a washer 213 of substantially “U” section as is seen in FIG. 2, so that the perimeter of the door opening 211 fits into the concavity of the “U”, one limb of the “U” provides a flat sealing surface for the outer door 22, and the convexity of the outer bend of the “U” is shaped to form two oppositely facing base-to-base conical sealing surfaces 213A and 213B which meet at an edge line 213C and mate with the conical flange surfaces 115, 232 of the connector body 11 and the inner door 23. The cone angles of the surfaces of the seal 213 are ca. 40°.

A method use of the above described components of the system of this invention will now be described.

Figure 1E:
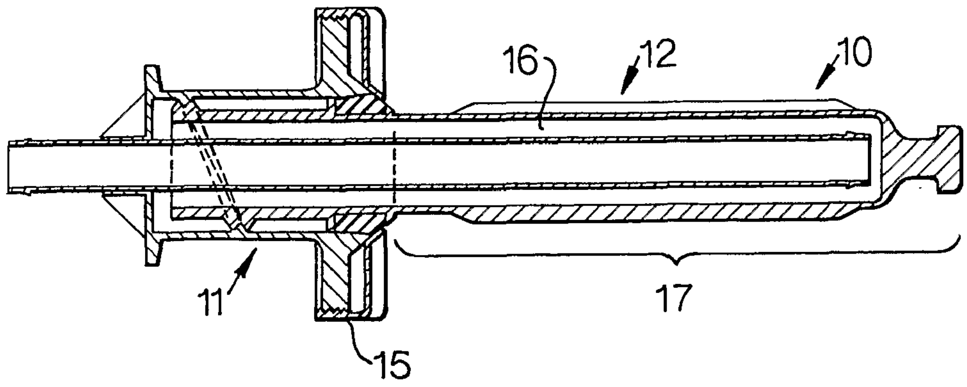

The first stage of a method of transfer of a liquid between the inside and outside of the compartment using the system of the invention involves the sterilisation of the interior of the enclosure 16 within the assembly of connector body 11 and cover 12 and consequently of the port 13, whilst the cover 12 and body 11 are assembled as shown in FIGS. 1C-1E, which can be achieved by conventional means, e.g. autoclaving or radiation etc. The assembly of body 11 and cover 12 may alternatively be provided in a pre-sterilised form.

FIGS. 3 to 11 show sequentially the typical steps involved in the method of use.

Figure 3:
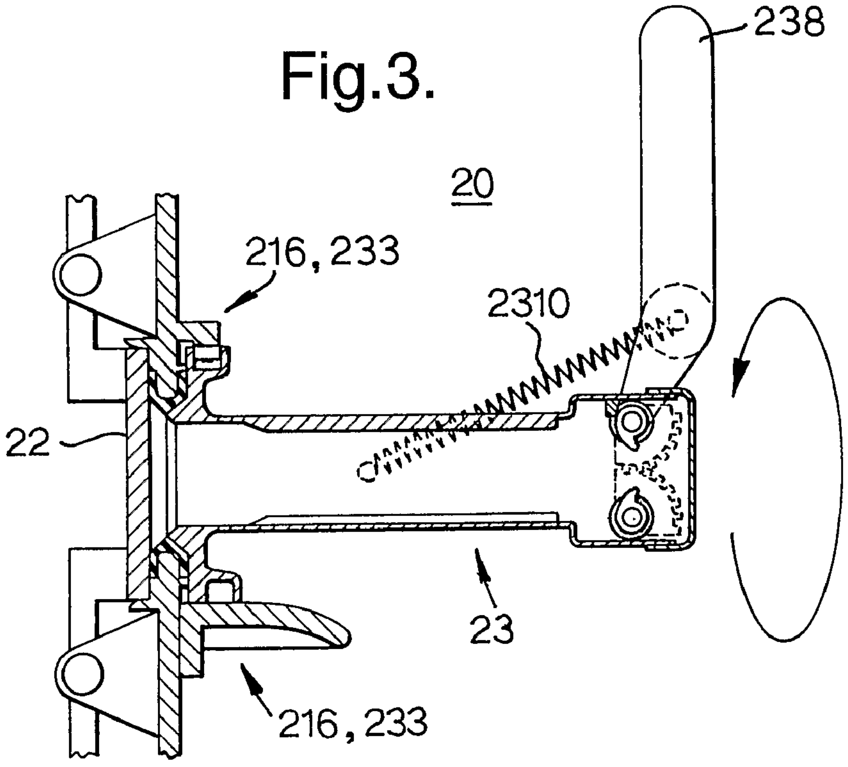
FIGS. 3 to 11 show sequential operation of the system.

As shown in FIG. 3 the inner door 23 is sealed with the wall part 21 of the compartment, via the bayonet connection parts 216, 233, a seal being formed between the flange surfaces 231, 232 and compression seal 213. Rotation to operate the bayonet connection is shown applied by the handle 238. The outer door 22 remains closed. The handle 238 may be aligned as shown in FIGS. 2 and 3 perpendicular to the rotation axis of the bayonet connection 216, 233 to allow convenient operating force to be applied. A spring 2310 helps to keep the handle 238 in this alignment. This alignment can be made clearly visible to the user and can be used as an indication of the status of the system. Normally the interior 20 of the compartment will be maintained sterile.

Figures 4, 5:
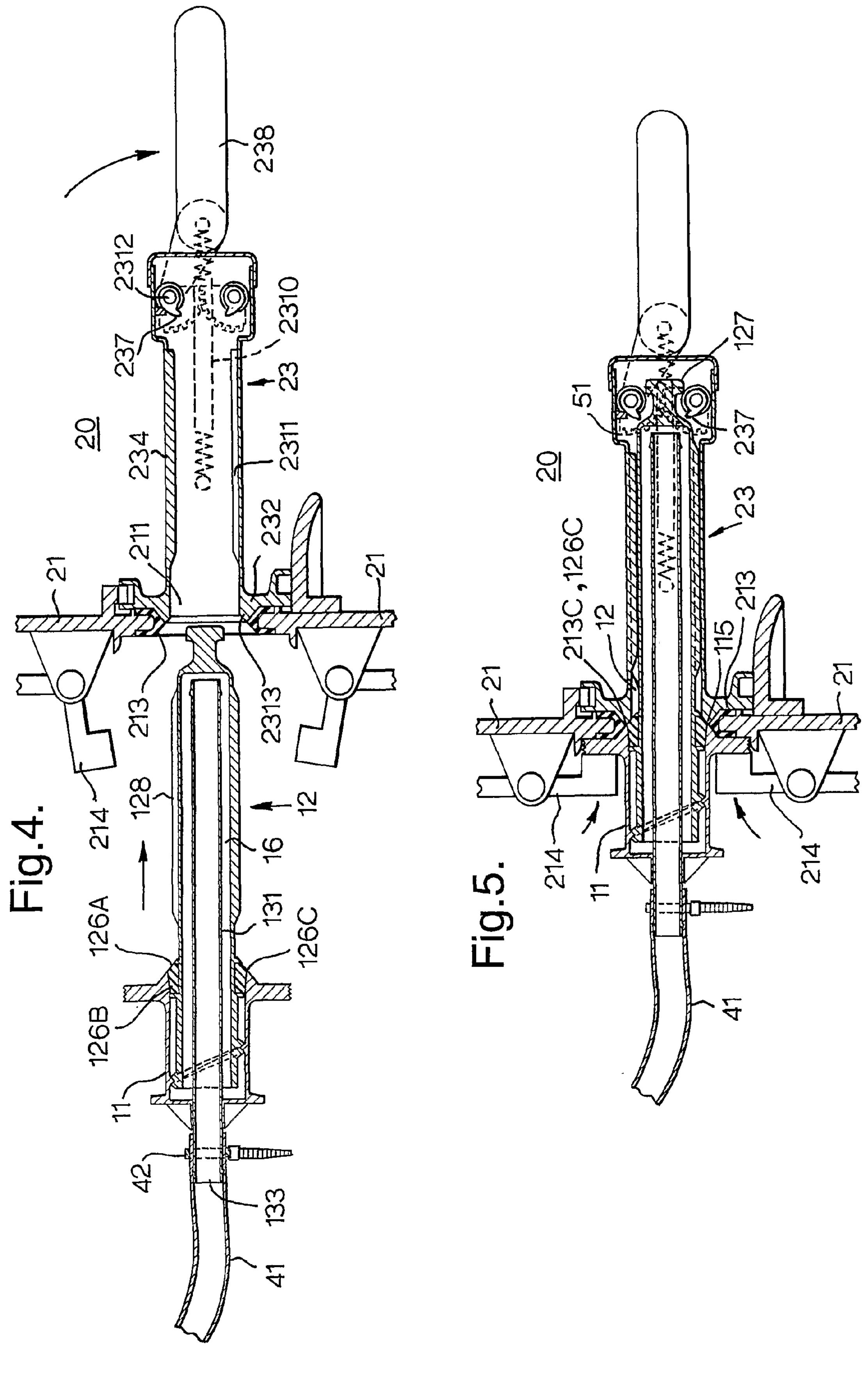

FIGS. 4 and 5 show the engagement of the assembly of connector body 11 and cover 12 with the inner door 23.

Referring to FIG. 4 the outer door opening 211 has been opened by disengagement of clamps 214 and complete removal of plate 22. A flexible PTFE liquid transfer tube 41 has been attached with clip 42 to open end 133 of tube 131. The inside of the tube 41 has also been sterilised in a conventional manner prior to connection to the tube 131 to thereby establish a sterile line of communication between tube 41 and tube 131. The connection of tubes 133 and 41 may be performed in a separate sterile glove box (not shown).

Nut 15 and tape 14 have been removed from the assembly of body 11 and cover 12, and the assembly 11, 12 is presented to open door opening 211. Jaws 237 are open.

Referring to FIG. 5, the assembly 11, 12 has engaged with door opening 211. The conical flange surface 115 has sealed against the mating surface of washer 213. Clamps 214 have been used to securely clamp and thereby seal the assembly 11, 12 against wall part 21.

The cover 12 is closely enclosed within the sheath part 23, with the engagement part 127 adjacent to and in the bite of jaws 237. The sheath part 23 seals against the outside of the cover 12 to enclose the parts 17 of the cover 12 which prior to engagement of the connector body 11 with the door opening 211 have been exposed to the environment outside the container. These parts of the cover are those to the right of the seal 126 in the assembly shown in FIGS. 1C, 1D and 1E. As the cover 12 is of the above described tubular shape, the sheath part 234 is in the form of a sleeve of an internal shape and size generally corresponding to the external shape of the cover 12, so that the cover 12 is a close conforming fit within the sheath part 234 and is able to move smoothly longitudinally (i.e. along the right-left direction as shown) within the sheath part 23.

A seal between the sheath part 234 and the cover 12 is achieved by the compression seal 126 which is positioned so as to be between the sheath part 234 and the cover 12 when the inner door 23 and cover 12 engage, and such that when the sub-assembly of connector body 11 and cover 12 is engaged with the wall part 21 the compression seal 126 is compressed between the cover 12 and the inner door 23. Flange 232 has a second conical mating surface 2313, and this surface 2313 mates against the surface 126A to provide the seal between sheath part 234 and cover 12. The sheath part 234 seals around the cover 12 at the open end 235 of the sheath part 234, with the bulk of the cover 12 enclosed within the sheath part 234. In this way, when engaged with the cover 12 the sheath part 234 of the inner door 23 together with the cover 12 forms an enclosure 51 that encloses the parts of the cover 12 which prior to engagement of the connector body 11 with the door opening 21 had been exposed to the environment outside the container.

It is seen that the single sealing washer 213 has opposite-facing base-to-base conical sealing surfaces 213A, 213B between respectively the wall part 21 and the flange 115 of connector body 11, and between the wall part 21 and the flange 232 of inner door 23, with a first line 213C where the two base-to-base conical surfaces meet. The sealing washer 126 between the connector body 11 and the cover 12 also has two base-to-base conical sealing surfaces 126A, 126B, with a second line 126C where the two base-to-base conical surfaces meet. When the connector body 11 is engaged with the wall part 21 and the inner door 23 is engaged with the cover 12, the first and second lines 213C and 126C coincide and define a line of confidence seal between the environment outside the compartment and the, for example sterile, environment 20 inside the compartment.

The inner surface of the sheath part 234 and the outer surface of the cover 12 have respective surface parts 128 and 2311 in the form of co-operating surface ribs that co-operate to provide a non-rotation engagement, so that when sheath part 234 is rotated the ribs 128, 2311 abut so that the cover 12 also rotates.

As seen in FIG. 4, in advance of the entrance of the cover 12 the handle 238 has been operated to move it into the position shown in which the jaws 237 are open, i.e. out of the perpendicular alignment and into an alignment approximately parallel to the axis of the sleeves. The handle 238 is pivoted at 2312. This provides a further safety feature in that with the handle 238 in this position it is very difficult to unintentionally turn the handle and open the inner door. The handle 238 is stabilised in either of the positions respectively shown in FIGS. 5 and 6 by the tension spring 2313. The position of the handle 238 can also be made clearly visible to an operator of the system.

Figure 6:
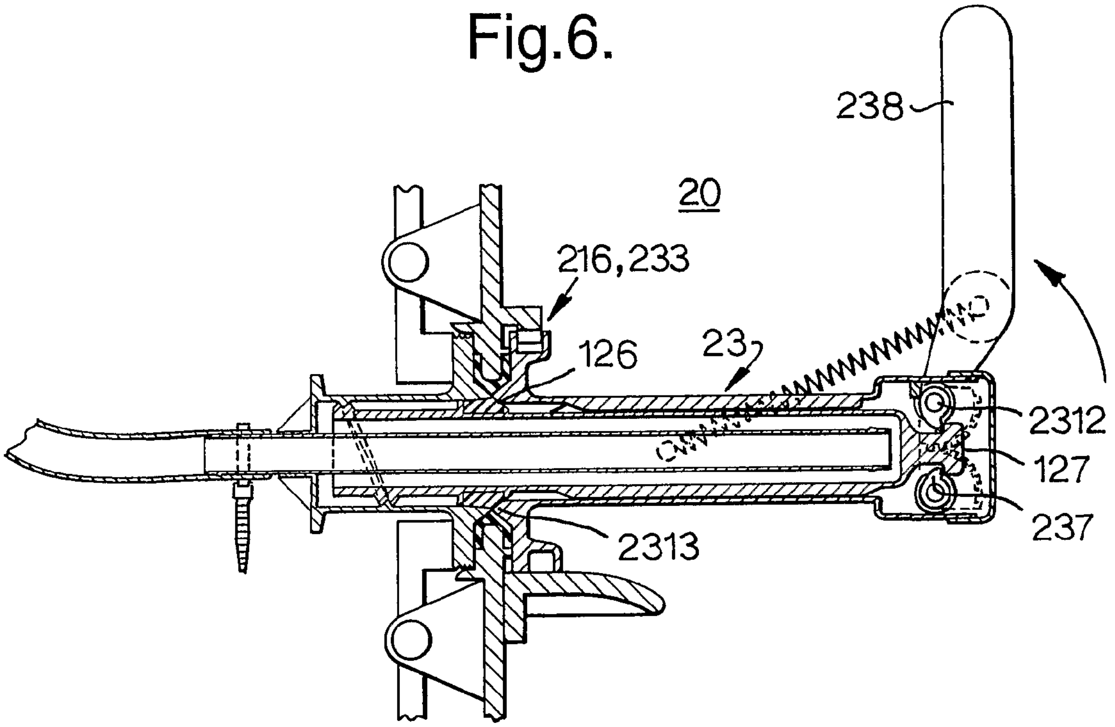
Figure 7:
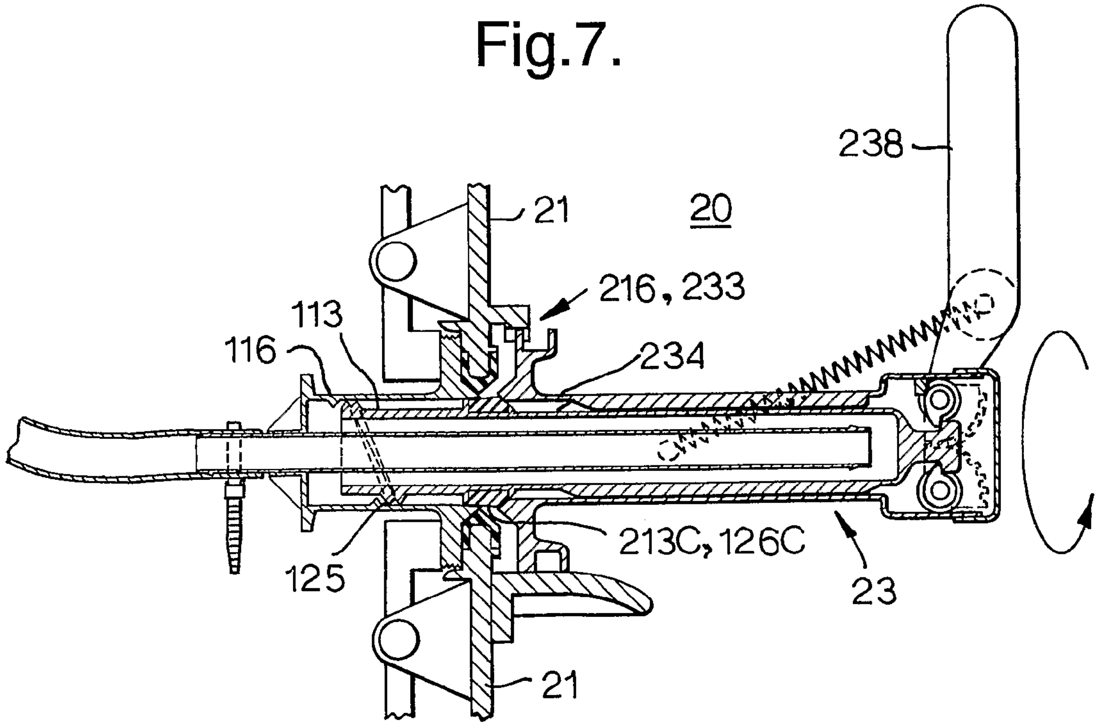

Referring to FIGS. 6 and 7, with the system engaged as shown in FIG. 5, handle 238 is returned by the operator to the position perpendicular to the axis of the sleeve 113, to close jaws 237 around engagement part 127. The mechanism of the jaws 237 is not shown in detail, but the jaws 237 are floating on the drive shaft which links them to handle 238 and are spring loaded. This enables the jaws 237 to apply pressure to engagement part 127 via the spring loading, so that the jaws 237 can accommodate a variety of shapes of engagement part 127, and also to allow the handle 238 to move through 90° between the extreme positions respectively shown in FIGS. 5 and 6 regardless of the shape of the engagement part 127. As the handle 238 is moved into the position shown in FIG. 6 the jaws 237 also pull on the engagement part 127 so as to pull the seal 126 tightly against the flange surface 2313 of the sheath part 23, to thereby form a tight seal between the cover 12 and the sheath part 23.

As seen in FIG. 7 handle 238 is operated to rotate the inner door 23 relative to the wall part 21 and disengage the bayonet connection 216, 233. The pitch of the bayonet connection 216, 232 is the same as that of the screw threads 116, 125 so the extent of rotation of the inner door 23 needed to disengage the bayonet connection 216, 233 is sufficient to cause dis-engagement of the screw threads 116, 125 and consequently dis-engage the body 11 and cover 12. At the same time the spring loading of the jaws 237 applies a strong pulling force to the cover 12 by means of engagement means 127 to hold the seal 126 tightly in compression against flange surface 232. This also holds the cover 12 engaged with the sheath part 234 of the inner door 23 in a fixed, particularly non-rotated, orientation so that when, as is shown below, the inner door 23 is re-engaged with the wall part 21, the threads 116, 125 remain correctly aligned for the cover sleeve 124 to engage the body sleeve 113.

It will be seen that the assembly of body 11 and wall part 21 splits with the assembly of cover 12 and inner door 23 at the coincident line 213C-126C. The line of confidence seal across the surface of seal 126 at the junction of the first and second lines 213C and 126C defines the line between parts of the cover (including seal 126) which have been isolated from the outside environment within the enclosure 16 and are hence sterile, and those parts 17 of the cover which have been exposed to the ambient environment and have become isolated from the sterile environment within the compartment by means of the sheath part 234. Therefore sterility within the compartment during the connection of the assembly of body 11 and cover 12 is maintained.

Figure 8:
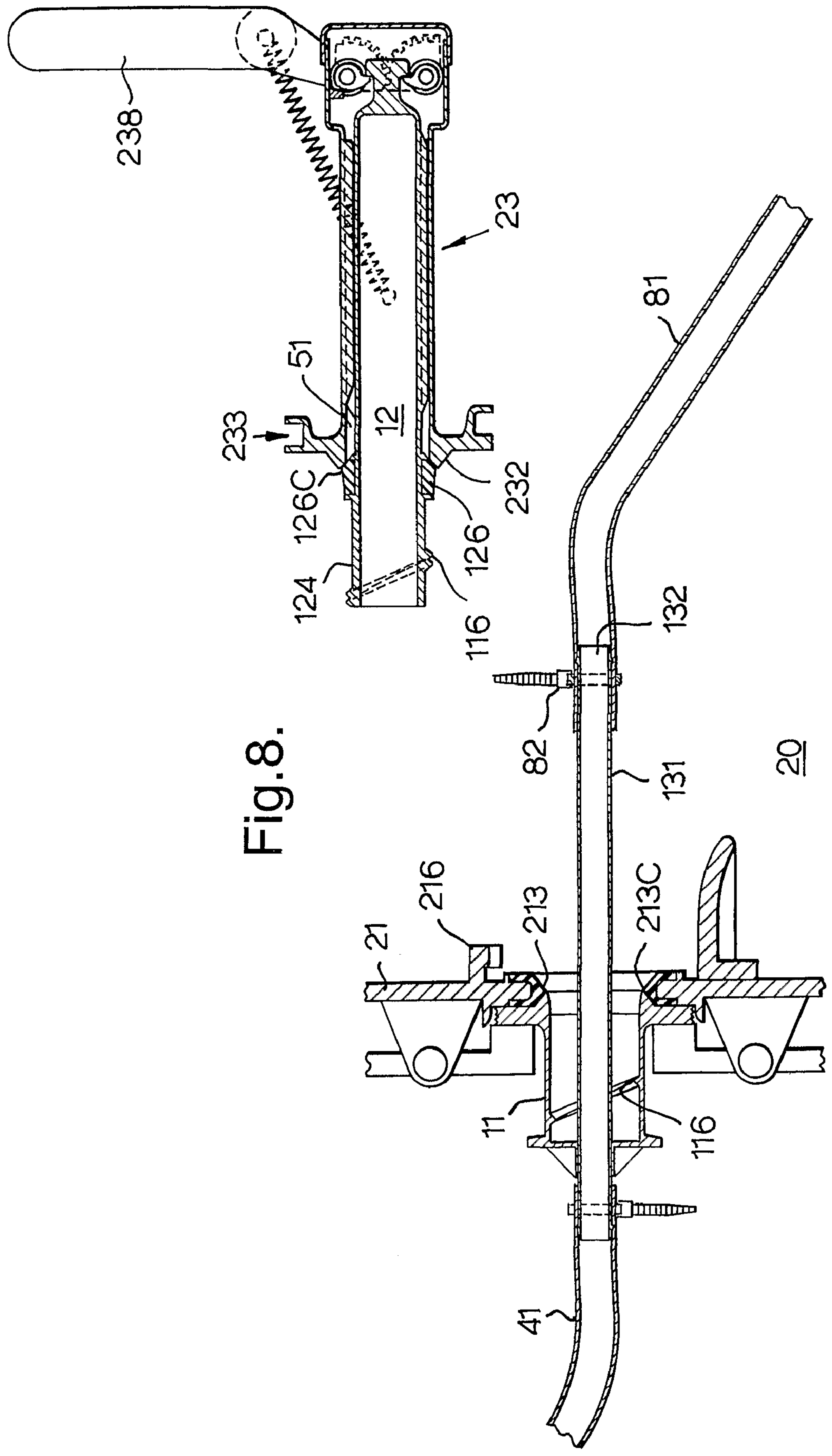

Referring to FIG. 8, the inner door 23 with the engaged cover 12 is now disengaged from wall part 21 by disengagement of bayonet connection 216, 233, and is completely removed from wall part 21, carrying the cover 12 partly enclosed within it. It is seen that the assembly of cover 12 and inner door 23 has split with the assembly of body 11 and wall part 21 at the single line of confidence between lines 213C and 126C. A liquid transfer tube 81 has been attached with clip 82 to the inner end 132 of tube 131. With both tubes 41 and 81 attached to tube 131 a liquid may be transferred from the outside of the compartment to the inside or vice-versa. The tube 81 may be independently sterilised and transferred into the interior 20 of the compartment e.g. by means of a second air lock entry port (not shown).

A safety feature, being a mechanism (not shown) to prevent both the outer and inner doors 22,23 being open simultaneously if a connector body 11 is not sealingly engaged with the wall part 21 may be used in relation with the last-described stage.

Figure 9:
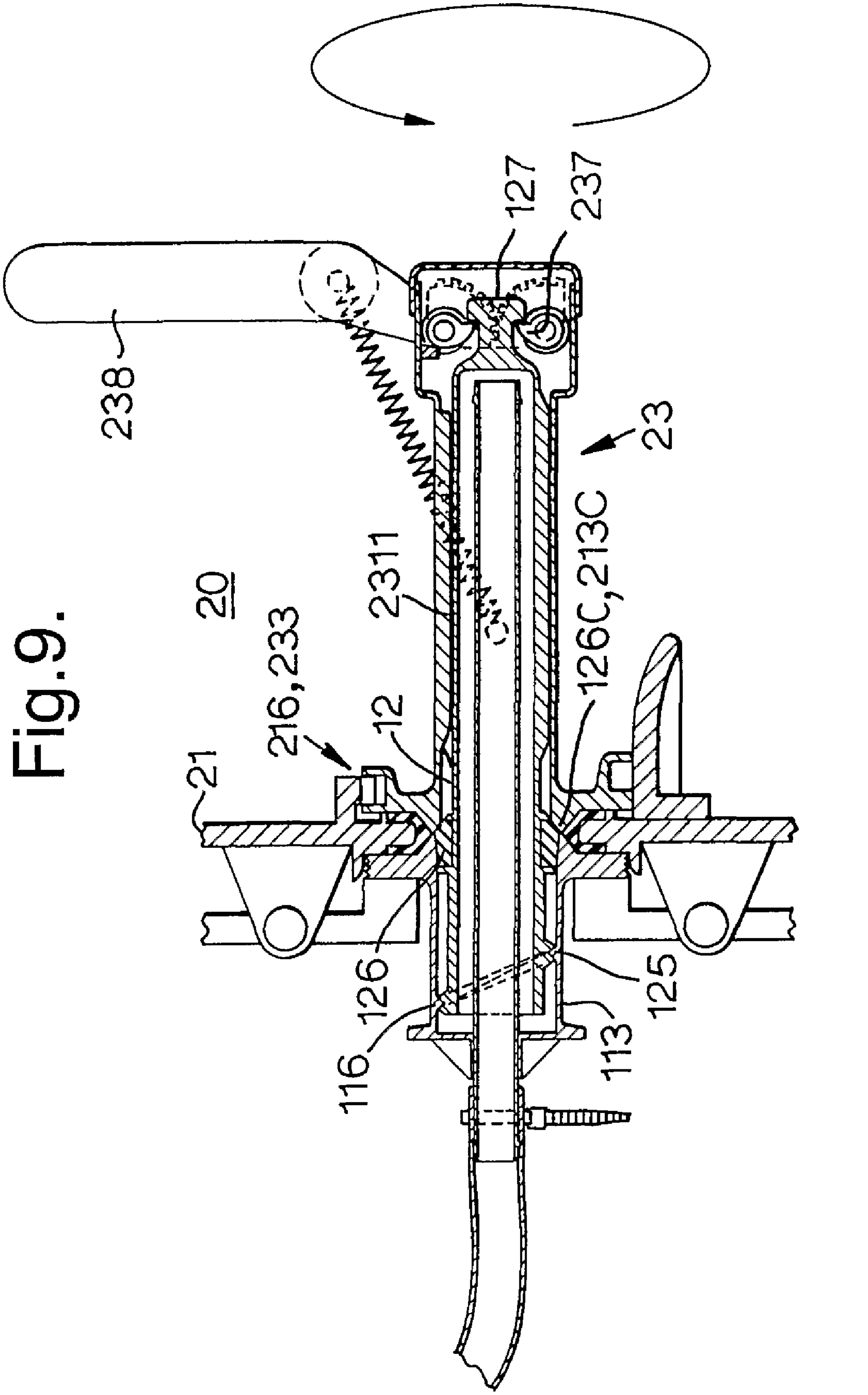
Figure 10:
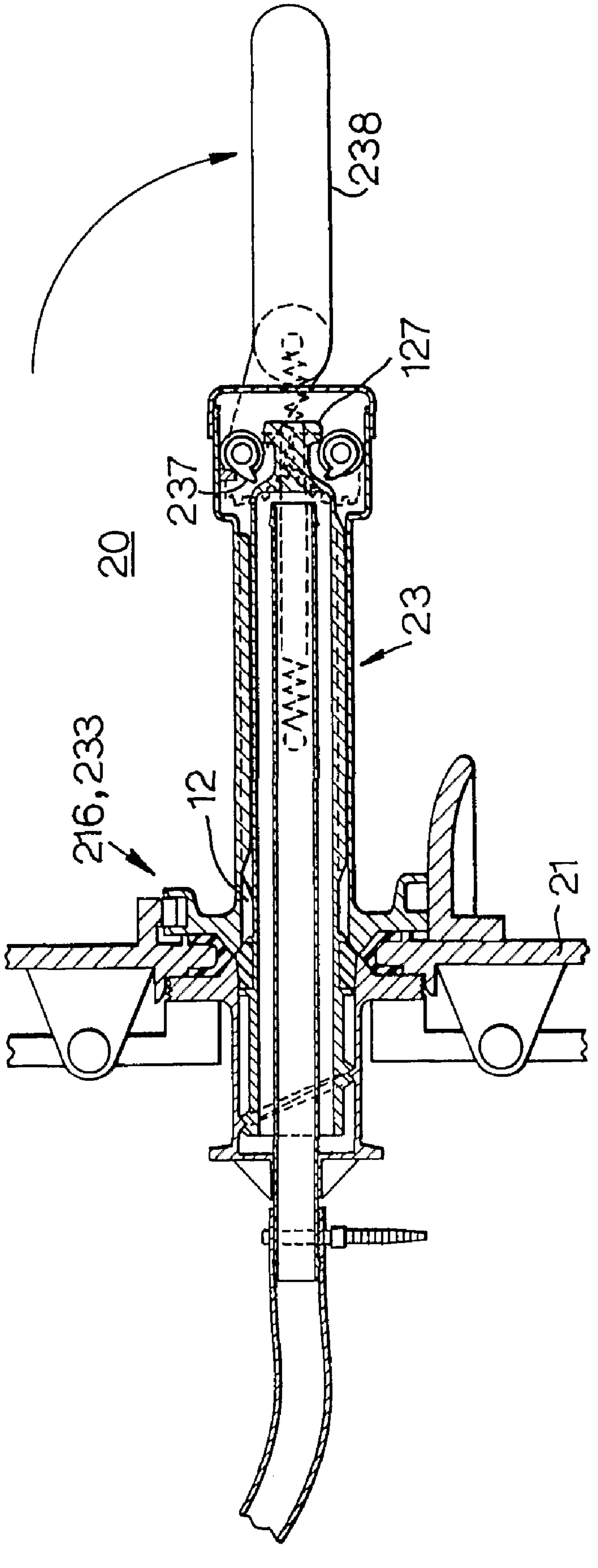

Referring to FIGS. 9 and 10, this shows the re-engagement of the inner door 23 by means of bayonet connection 216, 233 with the wall part 21 at the door opening 21. In FIG. 9 the inner door 23 has been re-engaged with the wall part 21 by a reverse procedure to that described above. The bayonet connection 216, 233 has first been re-engaged longitudinally. The handle 238 is in the perpendicular orientation to the rotation axis of the threads to facilitate the rotation of the inner door 23 to thereby both engage the bayonet connection 216, 233 and to rotate the screw thread 125 relative to the screw thread 116 so as to engage them. The handle 238 is operated to rotate the inner door 23 relative to the wall part 21 to re-engage the bayonet connection 216, 233. As mentioned above, the jaws 237 and non rotation engagement parts 128, 2311 ensure that the cover 12 is in a suitable orientation for the threads 116, 125 to engage as the cover sleeve 124 is re-inserted into the body sleeve 113. As the pitch of the bayonet connection 216, 233 is the same as that of the screw threads 116, 125 the threads 116, 125 are fully engaged at the same time as the bayonet connection 216, 233 is engaged. As the cover sleeve 124 is thereby directed longitudinally within body sleeve 113 the seal 126 is directed back into a mating seal with the surface 116, and the lines 126C and 213C coincide to re-form the line of confidence.

In FIG. 10 the handle 238 has been operated by movement into its non-perpendicular alignment to open jaws 237 and thereby release engagement part 127 of cover 12.

Figure 11:
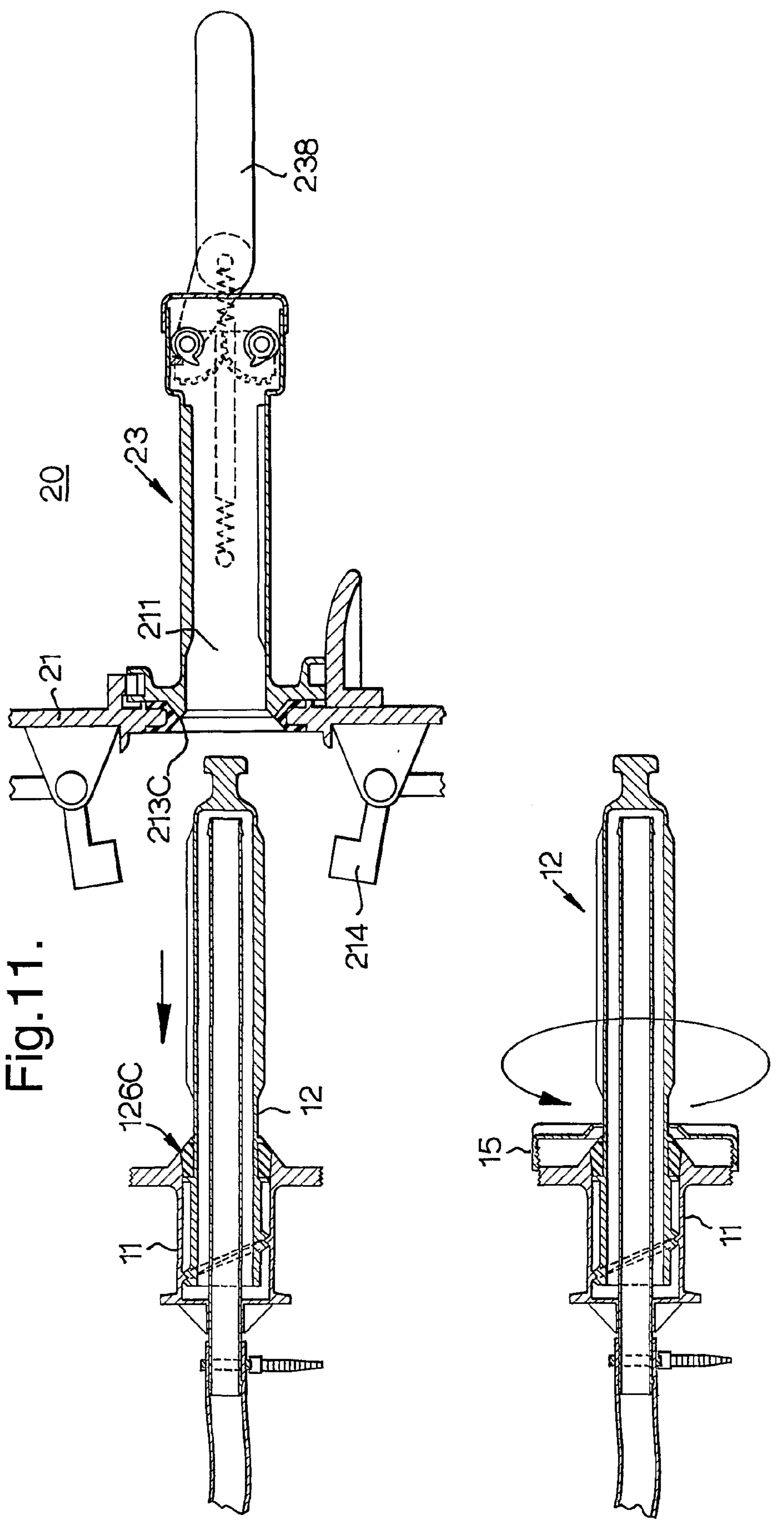

Referring to FIG. 11, clamps 214 have been opened, thereby allowing the assembly of body 11 and cover 12 to be removed from door opening 211. Retaining nut 15 may be replaced for security, and outer door 22 (not shown) may now be replaced. It is seen that the assembly of connector body 11 and wall part 21, and the assembly of cover 12 and inner door 23, split at the line 126C, 213C, defining a single line of confidence. This line of confidence is the line 126C of the seal between the connector body 11 and the cover 12, the line 213C of the seal between the cover 12 and the engaged inner door 23, the line 126C of the seal between the connector body 11 and the wall part 21, and the line 213C between the inner door 23 and the wall part 21, which all coincide to define a line of confidence seal.

We claim:

1. A method for transferring a material between the inside (20) and outside of a compartment using a system for connecting the interior (20) of a compartment to the exterior of the compartment which comprises:

a wall part (21) of the compartment having a door opening (211) therein passing through the wall (21) from inside to outside;

a connector body (11) sealingly engageable from the outside of the compartment with the wall part (21) around the door opening (211);

a connection port (13) passing through the connector body (11) from an inside facing surface to an outside facing surface of the connector body (11), the port having an inner opening (132) on the inside facing side of the connector body (11) and an outer opening (133) on the outside facing side of the connector body (11);

a cover (12) removeably mountable on the connector body (11) and which when mounted on the connector body (11) is sealed to the connector body (11) and together with the connector body (11) forms an enclosure (16) that encloses the inner opening (132) of the port (13) to thereby isolate the inner opening (132) of the port (13) from the environment outside the cover (12);

an outer door (22) of the door opening (211) which can seal the door opening (211) and is openable to allow the connector body (11) to be engaged with the wall part (21) with an inside facing side of the connector body (11) facing the interior (20) of the compartment, an inner door (23) which can seal the door opening (211) and is openable within the compartment, and is releasably engageable with the cover (12) when the connector body (11) is engaged with the wall part (21), so that the inner door (23) can be operated to thereby remove the engaged cover (12) from the connector body (11) so as to expose the inner opening of the port to the interior (20) of the compartment, and so that when engaged with the cover (12) the inner door (23) seals with the cover (12) to enclose the parts of the cover (12) which prior to engagement of the connector body (11) with the door opening (211) have been exposed to the environment outside the compartment and to isolate these from the interior (20) of the compartment, comprising;

in relation to a compartment having an interior (20) and an exterior, and a wall part (21) of the compartment having a door opening (211) therein passing through the wall (21) from inside to outside and with an outer door (22) closing the door opening (211) and with an inner door (23) being openable from within the compartment;

providing a connector body (11) which is sealingly engageable with the wall part (21) around the door opening (211) from the outside of the compartment;

the connector body (11) having a connection port (13) passing through the connector body (11) from an inside facing surface to an outside facing surface of the connector body (11), the port having an inner opening (132) on the inside facing side of the connector body (11) and an outer opening (133) on the outside facing side of the connector body (11) and having a cover (12) removeably mountable on the connector body (11) and which when mounted on the connector body (11) is sealed to the connector body (11) and together with the connector body (11) forms an enclosure (16) that encloses the inner opening (132) of the port (13) to thereby isolate the inner opening of the port from the environment outside the cover (12);

opening the outer door (22) of the door opening (211) and engaging the connector body (11) with the wall part (21) with the inside facing side facing the interior (20) of the compartment, releasably engaging the inner door (23) with the cover (12) when the connector body (11) is engaged with the wall part (21), to form an enclosure between the inner door (23) and the cover (12) that encloses the parts of the cover (12) which prior to engagement of the connector body (11) with the door opening (211) have been exposed to the environment outside the container, operating the inner door (23) to thereby remove the engaged cover (12) from the connector body (11) so as to expose the inner opening of the port to the interior (20) of the compartment, opening the inner door (23), and transferring a material through the port (13) from the outside of the compartment to the inside (20) of the compartment or vice versa.

2. A method for transferring a material between the inside (20) and outside of a compartment using a system according to claim 1 characterised in that the connector body (11) is of a generally tabular shape having an open end (111) which when the connector body (11) is engaged with the wall part (21) faces into the interior (20) of the compartment and an opposite closed end (112), and the part (113) of the connector body (11) adjacent to the open end comprises a tubular body sleeve, comprising:

in relation to a compartment having an interior (20) and an exterior, and a wall part (21) of the compartment having a door opening (2110 therein passing through the wall (21) from inside to outside and with an outer door (22) closing the door opening (211) and with an inner door (23) being openable from within the compartment;

providing a connector body (11) which is sealingly engageable with the wall part (21) around the door opening (211) from the outside of the compartment;

the connector body (11) having a connection port (13) passing through the connector body (11) from an inside facing surface to an outside facing surface of the connector body (11), the port having an inner opening (132) on the inside facing side of the connector body (11) and an outer opening (133) on the outside facing side of the connector body (11) and having a cover (12) removeably mountable on the connector body (11) and which when mounted on the connector body (11) is sealed to the connector body (11) and together with the connector body (11) forms an enclosure (16) that encloses the inner opening (132) of the port (13) to thereby isolate the inner opening of the port from the environment outside the cover (12);

opening the outer door (22) of the door opening (211) and engaging the connector body (11) with the wall part (21) with the inside facing side facing the interior (20) of the compartment, releasably engaging the inner door (23) with the cover (12) when the connector body (11) is engaged with the wall part (21), to form an enclosure between the inner door (23) and the cover (12) that encloses the parts of the cover (12) which prior to engagement of the connector body (11) with the door opening (211) have been exposed to the environment outside the container, operating the inner door (23) to thereby remove the engaged cover (12) from the connector body (11) 50 as to expose the inner opening of the port to the interior (20) of the compartment, opening the inner door (23), and transferring a material through the port (13) from the outside of the compartment to the inside (20) of the compartment or vice versa.

3. A method for transferring a material between the inside (20) and outside of a compartment using a system according to claim 2 characterised in that the connector body (911) has a sealing surface (114) which mates with a corresponding sealing surface (213) of the wall part (21) around the door opening (211), and the sealing surface comprises a sealing flange (114) mating sealingly with a corresponding mating surface (212) of the wall part (21) around the door opening (211) and said sealing flange (114) has a convex conical flange surface (115) which mates with a corresponding concave conical mating surface (213A) of the wall part (21) comprising:

in relation to a compartment having an interior (20) and an exterior, and a wall part (21) of the compartment having a door opening (2110 therein passing through the wall (21) from inside to outside and with an outer door (22) closing the door opening (211) and with an inner door (23) being openable from within the compartment;

providing a connector body (11) which is sealingly engageable with the wall part (21) around the door opening (211) from the outside of the compartment;

the connector body (11) having a connection port (13) passing through the connector body (11) from an inside facing surface to an outside facing surface of the connector body (11), the port having an inner opening (132) on the inside facing side of the connector body (11) and an outer opening (133) on the outside facing side of the connector body (11) and having a cover (12) removeably mountable on the connector body (11) and which when mounted on the connector body (11) is sealed to the connector body (11) and together with the connector body (11) forms an enclosure (16) that encloses the inner opening (132) of the port (13) to thereby isolate the inner opening of the port from the environment outside the cover (12);

opening the outer door (22) of the door opening (211) and engaging the connector body (11) with the wall part (21) with the inside facing side facing the interior (20) of the compartment, releasably engaging the inner door (23) with the cover (12) when the connector body (11) is engaged with the wall part (21), to form an enclosure between the inner door (23) and the cover (12) that encloses the parts of the cover (12) which prior to engagement of the connector body (11) with the door opening (211) have been exposed to the environment outside the container, operating the inner door (23) to thereby remove the engaged cover (12) from the connector body (11) so as to expose the inner opening of the port to the interior (20) of the compartment, opening the inner door (23), and transferring a material through the port (13) from the outside of the compartment to the inside (20) of the compartment or vice versa.

4. A method according to claim 1, 2, or 3 characterised by a subsequent stage in which the connector body (11) is removed from the compartment, in which:

with the connector body (11) engaged with the wall part (21), operating the inner door (23), with the cover (12) releasably engaged with the inner door (23), to thereby engage the cover (12) with the connector body (11) to form an enclosure that encloses the inner opening (132) of the port (13) to thereby isolate the inner opening of the port from the environment outside the cover (12), sealingly engaging the inner door (23) with the inner surface of the wall part (21) of the compartment around the door opening (211), dis-engaging the inner door (23) from the cover (12), dis-engaging the connector body (11) from the wall part (21), and closing the outer door (22).

* * * * *